No. 738,986. PATENTED SEPT. 15, 1903.
M. B. COVERT.
FRYING PAN COVER.
APPLICATION FILED MAY 19, 1902.
NO MODEL.

WITNESSES:

INVENTOR
Mabel B. Covert
BY
ATTORNEYS

No. 738,986. Patented September 15, 1903.

UNITED STATES PATENT OFFICE.

MABEL BUOY COVERT, OF NORFOLK, NEBRASKA.

FRYING-PAN COVER.

SPECIFICATION forming part of Letters Patent No. 738,986, dated September 15, 1903.

Application filed May 19, 1902. Serial No. 107,886. (No model.)

*To all whom it may concern:*

Be it known that I, MABEL BUOY COVERT, a citizen of the United States, and a resident of Norfolk, county of Madison, and State of Nebraska, have invented certain new and useful Improvements in Frying-Pan Covers, of which the following is a specification, reference being had to the accompanying drawings, forming a part thereof, in which similar characters of reference indicate corresponding parts.

This invention relates to frying-pan covers, the object thereof being to provide a utensil of this character which is so constructed that it may be employed as a cover for the pan during the process of frying meats without liability of retaining the steam which usually forms and injuriously moistens the meat when an ordinary pan-cover is used; but at the same time the device retains all the heat and the natural juices and extracts of the meat, thus producing a well-cooked and perfectly-flavored article of diet.

The invention will be hereinafter fully described, and specifically set forth in the annexed claims.

Figure 1:
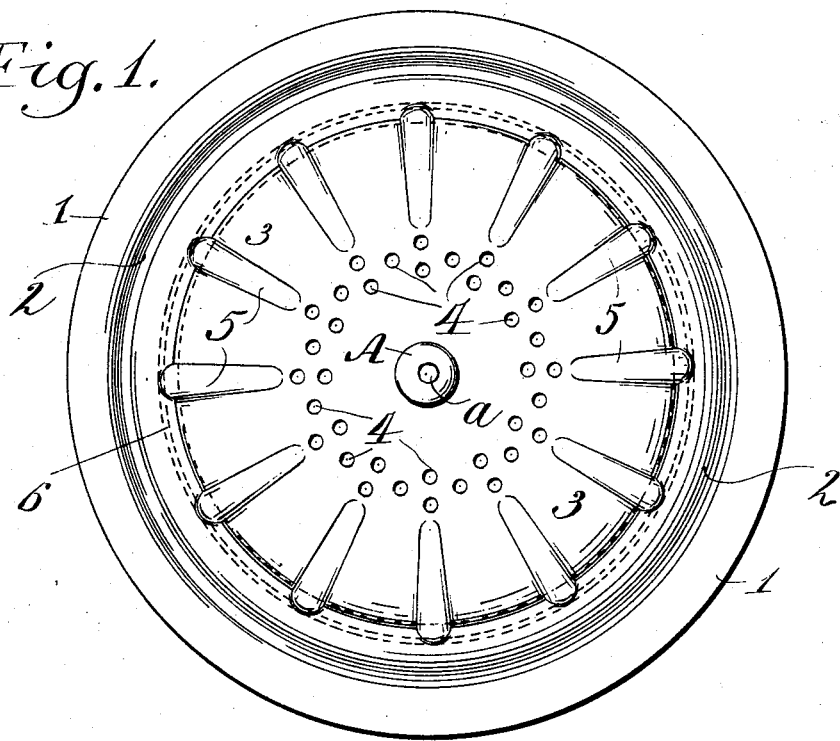
Figure 2:
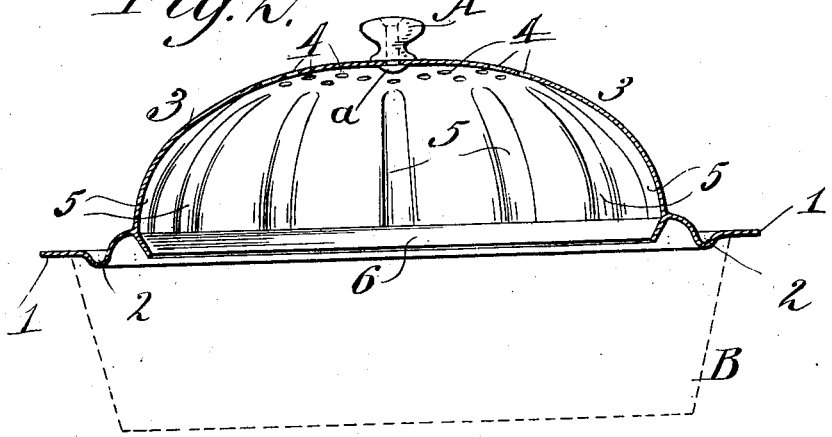

In the accompanying drawings, forming part of this specification, Figure 1 is a plan view of my improved pan-cover, and Fig. 2 is a cross-sectional elevation thereof.

In the practice of my invention the device is preferably constructed of stamped sheet metal, and it embodies the flat rim 1, the downwardly-extended annular rib 2, and the dome 3. The apex of the dome 3 is provided with a handle A, which is composed of non-heat-conducting material and is secured by means of the rivet $a$. The dome is further provided with a series of perforations 4 for outlet of steam, and a plurality of channels 5 for conducting the meat extracts which may be splattered against the inner walls of the dome during the process of frying the meat, as will be hereinafter described. The said channels 5 empty into an annular hopper 6, which is adapted to discharge and convey the meat juices back to the pan.

In the operation and use of the invention the device is placed over a suitable frying-pan, as B, illustrated by dotted lines, Fig. 2, of the drawings, with the flat rim 1, contacting over the edge of the pan to make an approximately tight jointure, so that heat may be retained. Then during the process of frying the meat a large volume of the heated air is retained within the dome over the meat for the purpose of assisting in the cooking; but the steam or watery vapor will escape through the apertures 4 and condense in the outer atmosphere, or should any steam condense on the outside of the dome it will simply collect within the annular groove formed by the rib 2 and not drip into the pan. The non-volatile fatty substance and meat juices which may splatter against the walls of the dome during the frying process will by reason of the grooved construction of the dome drip downwardly upon the beveled flange forming the hopper 6, and from thence be returned to the pan, whereby the meat is not deprived of any of its natural flavor and the cooking process is conducted in a cleanly and efficient manner without liability of greasing or splattering either the stove or the garments of the cook.

I do not confine myself to the specific details of design nor contour of the device as herein shown and described, as it is obvious that under the scope of my invention I am entitled to slight structural variations.

Having now described my invention, what I claim as new, and desire to secure by Letters Patent, is—

1. A frying-pan cover comprising a dome and a horizontal supporting-flange, said dome being provided with perforations through its top, and with radial channels, and said horizontal supporting-flange being provided with an annular groove, substantially as shown and described.

2. A frying-pan cover comprising a dome, a horizontal supporting-flange, and an internal annular hopper, said dome being provided with perforations through its top, and with radial channels discharging into said hopper, and said horizontal supporting-flange being provided with an annular groove, substantially as described.

In testimony that I claim the foregoing as my invention I have signed my name, in presence of two witnesses, this 18th day of March, 1902.

MABEL BUOY COVERT.

Witnesses:
MINO E. MCNEELY,
JAMES M. COVERT.